US00RE45713E

(19) United States
(12) Reissued Patent
Oren et al.

(10) Patent Number: US RE45,713 E
(45) Date of Reissued Patent: Oct. 6, 2015

(54) PROPPANT VESSEL BASE

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

(21) Appl. No.: 29/500,685

(22) Filed: Aug. 27, 2014

Related U.S. Patent Documents

Reissue of:
(64) Patent No.: Des. 688,349
Issued: Aug. 20, 2013
Appl. No.: 29/436,168
Filed: Nov. 2, 2012

(51) LOC (10) Cl. ..... 23-01
(52) U.S. Cl.
USPC ..... D23/202
(58) Field of Classification Search
USPC ..... D23/202–206; 222/185.1, 460; 206/386, 600; 414/813; 220/581
See application file for complete search history.

(56) References Cited

U.S. PATENT DOCUMENTS

| | | | |
|---|---|---|---|
| 137,871 | A | 4/1873 | Worsley |
| 150,894 | A | 5/1874 | Safely |
| 1,143,641 | A | 6/1915 | McGregor |
| 1,331,883 | A | 2/1920 | Stuart |
| 1,573,664 | A | 2/1926 | Wetherill |
| 1,850,000 | A | 3/1932 | Fernand |
| 2,616,758 | A | 11/1952 | Meyers |
| 2,622,771 | A | 12/1952 | Tulou |
| 2,652,174 | A | 9/1953 | Shea et al. |

(Continued)

FOREIGN PATENT DOCUMENTS

| | | |
|---|---|---|
| JP | 10264882 | 10/1998 |
| WO | 2012058059 | 5/2012 |

OTHER PUBLICATIONS

International Search Report for related International Application No. PCT/US2012/066639, Feb. 25, 2013.

(Continued)

*Primary Examiner* — Phillip S Hyder
(74) *Attorney, Agent, or Firm* — Hogan Lovells US LLP

(57) CLAIM

The ornamental design for a proppant vessel base, as shown and described.

DESCRIPTION

FIG. 1 is an upper perspective view of the proppant vessel base showing *an embodiment of* our design[.]*;*
FIG. 2 is a front [elevation] *elevational* view [thereof] *of the embodiment of FIG. 1*;
FIG. 3 is a rear [elevation] *elevational* view [thereof] *of the embodiment of FIG. 1*;
FIG. 4 is a *right* side [elevation] *elevational* view [thereof] *of the embodiment of FIG. 1*;
FIG. 5 is [an opposite] *a left* side [elevation] *elevational* view [thereof] *of the embodiment of FIG. 1*;
FIG. 6 is a top plan view [thereof] *of the embodiment of FIG. 1*; and,
FIG. 7 is a bottom plan view [thereof] *of the embodiment of FIG. 1*.
[The features presented in broken lines are for environmental purposes only and form no part of the claimed design] *The broken lines depict portions of the proppant vessel in which the design is embodies that are not considered part of the claimed design.*

1 Claim, 2 Drawing Sheets

Figure 1:
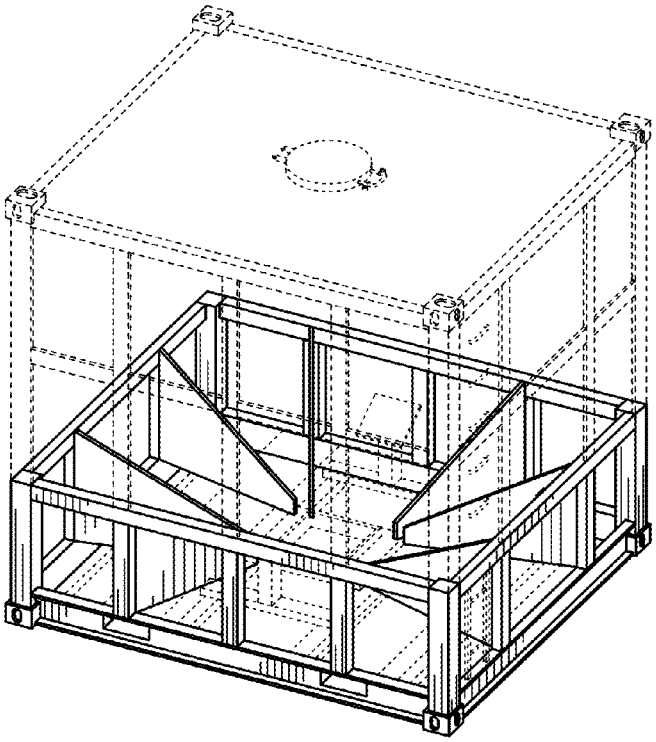
Figure 6:
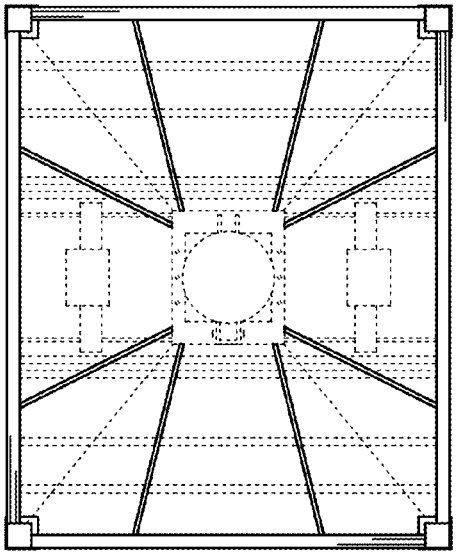

Matter enclosed in heavy brackets [ ] appears in the original patent but forms no part of this reissue; matter printed in italics indicates the additions made by reissue.

(56) References Cited

U.S. PATENT DOCUMENTS 2,865,521 A 12/1958 Fisher et al.
2,894,666 A 7/1959 Campbell, Jr.
3,090,527 A 5/1963 Rensch
3,248,026 A 4/1966 Kemp
3,270,921 A 9/1966 Nadolske et al.
3,281,006 A 10/1966 Tohchung
3,294,306 A 12/1966 Areddy
3,318,473 A 5/1967 Jones et al.
3,378,152 A 4/1968 Warner
3,387,570 A 6/1968 Pulcrano et al.
3,397,654 A 8/1968 Snyder
3,407,971 A 10/1968 Oehler
D216,511 S * 1/1970 Coleman ..... D23/202
3,601,244 A 8/1971 Ort et al.
3,602,400 A 8/1971 Cooke
3,661,293 A 5/1972 Gerhard et al.
3,738,511 A 6/1973 Lemon et al.
3,785,534 A 1/1974 Smith
3,986,708 A 10/1976 Hellzel et al.
4,004,700 A 1/1977 Empey
4,063,656 A 12/1977 Lambert
4,138,163 A 2/1979 Calvert et al.
RE30,358 E 8/1980 Sensibar
4,247,228 A 1/1981 Gray et al.
4,265,266 A 5/1981 Kierbow et al.
4,282,988 A 8/1981 Hulbert, Jr.
4,350,241 A 9/1982 Wenzel
4,359,176 A 11/1982 Johnson
4,363,396 A 12/1982 Wolf et al.
4,397,406 A 8/1983 Croley
4,398,653 A 8/1983 Daloisio
4,402,392 A 9/1983 Fabian et al.
4,407,202 A 10/1983 McCormick
4,428,504 A 1/1984 Bassett et al.
4,449,861 A 5/1984 Saito et al.
4,608,931 A 9/1986 Ruhmann et al.
4,626,155 A 12/1986 Hlinsky et al.
4,701,095 A 10/1987 Berryman et al.
4,715,754 A 12/1987 Scully
4,801,389 A 1/1989 Brannon et al.
4,819,830 A 4/1989 Schultz
4,848,605 A 7/1989 Wise
4,909,556 A 3/1990 Koskinen
4,919,583 A 4/1990 Speakman, Jr.
4,946,068 A 8/1990 Erickson et al.
4,975,205 A 12/1990 Sloan
4,995,522 A 2/1991 Barr
5,105,858 A 4/1992 Levinson
5,199,826 A 4/1993 Lawrence
5,201,546 A 4/1993 Lindsay
5,224,635 A 7/1993 Wise
5,286,158 A 2/1994 Zimmerman
5,373,792 A 12/1994 Pileggi et al.
5,402,915 A 4/1995 Hogan
5,441,321 A 8/1995 Karpisek
5,470,175 A 11/1995 Jensen et al.
5,538,286 A 7/1996 Hoff
5,564,599 A 10/1996 Barber et al.
5,613,446 A 3/1997 DiLuigi et al.
RE35,580 E 8/1997 Heider et al.
5,690,466 A 11/1997 Gaddis et al.
5,704,477 A * 1/1998 Hermann et al. ..... 206/386
5,782,524 A 7/1998 Heider et al.
5,806,863 A 9/1998 Heger et al.
5,836,480 A 11/1998 Epp et al.
5,911,337 A 6/1999 Bedeker
5,927,558 A 7/1999 Bruce
5,971,219 A 10/1999 Karpisek
6,002,063 A 12/1999 Bilak et al.
6,069,118 A 5/2000 Hinkel et al.
6,109,486 A 8/2000 Lee, Jr.
6,120,233 A 9/2000 Adam
6,155,175 A 12/2000 Rude et al.
6,190,107 B1 2/2001 Lanigan et al.
6,192,985 B1 2/2001 Hinkel et al.
6,205,938 B1 3/2001 Foley et al.
6,247,594 B1 6/2001 Garton
6,283,212 B1 9/2001 Hinkel et al.
6,306,800 B1 10/2001 Samuel et al.
6,328,183 B1 12/2001 Coleman
6,401,983 B1 6/2002 McDonald et al.
6,415,909 B1 7/2002 Mitchell et al.
6,457,291 B2 10/2002 Wick
6,508,615 B2 1/2003 Taylor
6,660,693 B2 12/2003 Miller et al.
6,720,290 B2 4/2004 England et al.
6,772,912 B1 8/2004 Schall et al.
6,776,235 B1 8/2004 England
6,783,032 B2 8/2004 Fons
6,828,280 B2 12/2004 England et al.
6,835,041 B1 12/2004 Albert
6,902,061 B1 6/2005 Elstone
6,915,854 B2 7/2005 England et al.
6,968,946 B2 11/2005 Shuert
7,036,662 B2 * 5/2006 Schutz ..... 206/386
7,084,095 B2 8/2006 Lee et al.
7,104,425 B2 9/2006 Le Roy
7,140,516 B2 11/2006 Bothor
7,240,681 B2 7/2007 Saik
7,252,309 B2 8/2007 Eng Soon
7,284,579 B2 10/2007 Elgan et al.
7,316,333 B2 1/2008 Wegner
7,475,796 B2 1/2009 Garton
7,837,427 B2 11/2010 Beckel
7,878,327 B2 * 2/2011 Cassina ..... 206/386
7,897,223 B2 * 3/2011 Schubbach et al. ..... 428/35.7
7,921,783 B2 4/2011 Forbes et al.
7,958,995 B2 * 6/2011 Dedmon et al. ..... 206/386
7,967,161 B2 6/2011 Townsend
8,083,083 B1 12/2011 Mohns
8,201,520 B2 6/2012 Meritt
8,616,370 B2 12/2013 Allegretti
8,887,914 B2 11/2014 Allegretti
2001/0022308 A1 9/2001 Epp et al.
2003/0111470 A1 6/2003 Fouillet et al.
2004/0084874 A1 5/2004 McDougall et al.
2004/0245284 A1 12/2004 Mehus et al.
2005/0201851 A1 9/2005 Jonkka
2006/0180062 A1 8/2006 Furrer et al.
2006/0180232 A1 8/2006 Glewwe et al.
2006/0239806 A1 10/2006 Yelton
2006/0267377 A1 11/2006 Lusk et al.
2007/0125543 A1 6/2007 McNeel et al.
2008/0008562 A1 1/2008 Beckel et al.
2008/0029546 A1 2/2008 Shuld
2008/0029553 A1 2/2008 Culleton
2008/0179054 A1 7/2008 McGough et al.
2008/0179324 A1 7/2008 McGough et al.
2008/0213073 A1 9/2008 Benedict et al.
2008/0226434 A1 9/2008 Smith et al.
2008/0264641 A1 10/2008 Slabaugh et al.
2009/0038242 A1 2/2009 Cope
2009/0078410 A1 3/2009 Krenek et al.
2010/0038143 A1 2/2010 Burnett et al.
2010/0040446 A1 2/2010 Renyer
2011/0011893 A1 1/2011 Cerny
2011/0101040 A1 5/2011 Weissbrod
2012/0219391 A1 8/2012 Teichrob et al.
2013/0022441 A1 1/2013 Uhryn et al.
2013/0206415 A1 8/2013 Sheesley
2013/0209204 A1 8/2013 Sheesley
2014/0097182 A1 4/2014 Sheesley
2014/0166647 A1 6/2014 Sheesley
2014/0203046 A1 7/2014 Allegretti
2014/0234059 A1 8/2014 Thomeer
2014/0321950 A1 10/2014 Krenek et al.

OTHER PUBLICATIONS

International Search Report for related International Application No. PCT/US2013/035442, Jun. 23, 2013.
International Search Report for related International Application No. PCT/US2013/032819, May 23, 2013.
International Search Report for related International Application No. PCT/US2013/049028, Mar. 4, 2014.

(56) References Cited

OTHER PUBLICATIONS

International Preliminary Report on Patentability for PCT/US2012/066639, Feb. 26, 2013.

International Preliminary Report on Patentability for PCT/US2013/032819, Sep. 23, 2014.

* cited by examiner

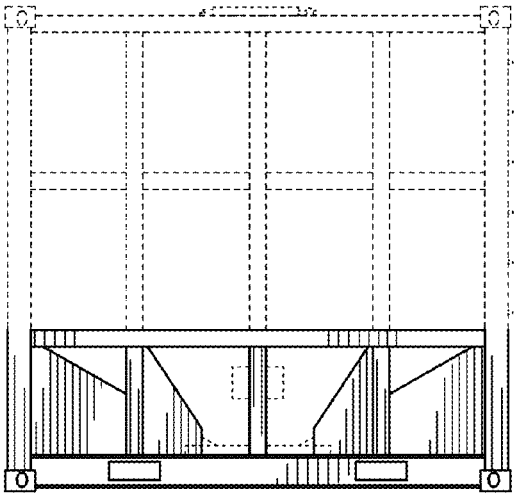
FIG. 2
Amended
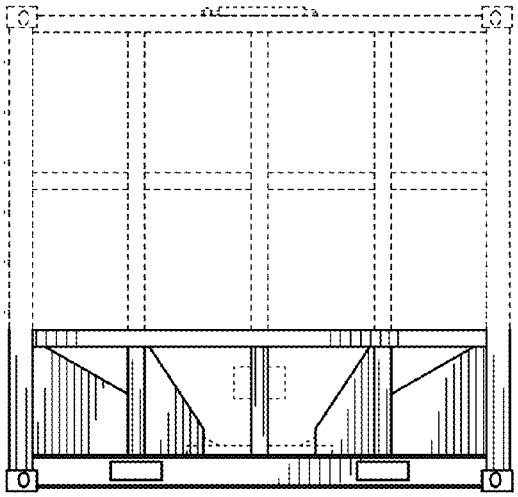
FIG. 3
Amended

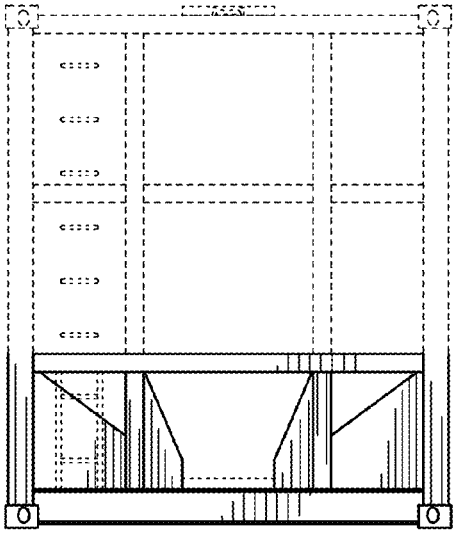
FIG. 4
Amended
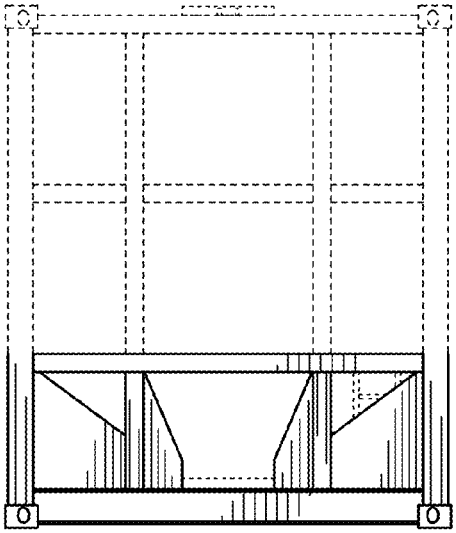
FIG. 5
Amended
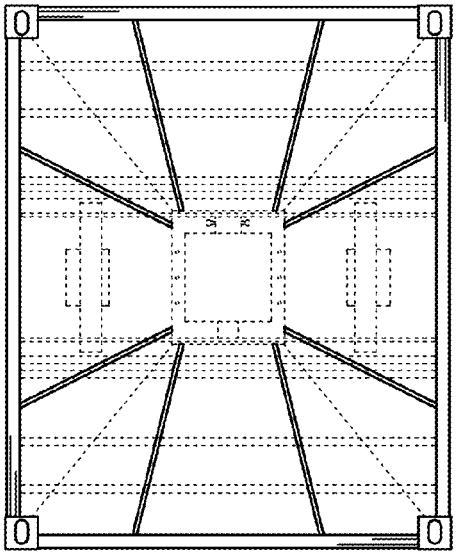
FIG. 7
Amended